(12) United States Patent  
Suen et al.

(10) Patent No.: US 8,767,269 B2  
(45) Date of Patent: Jul. 1, 2014

(54) PORTABLE SCANNER

(75) Inventors: Chih Hoh Suen, Hong Kong (HK); Watson Li, Hong Kong (HK)

(73) Assignee: Sunwell Concept Limited, Hong Kong (HK)

( * ) Notice: Subject to any disclaimer, the term of this patent is extended or adjusted under 35 U.S.C. 154(b) by 0 days.

(21) Appl. No.: 13/559,618

(22) Filed: Jul. 27, 2012

(65) Prior Publication Data

US 2012/0300269 A1 Nov. 29, 2012

Related U.S. Application Data

(63) Continuation of application No. PCT/CN2012/071245, filed on Feb. 17, 2012.

(60) Provisional application No. 61/444,782, filed on Feb. 20, 2011.

(51) Int. Cl.  
*H04N 1/024* (2006.01)  
*H04N 1/04* (2006.01)  
*H04N 1/32* (2006.01)

(52) U.S. Cl.  
USPC ........... 358/473; 358/486; 358/488; 358/474; 358/442

(58) Field of Classification Search  
USPC ......... 358/473, 472, 474, 488, 486, 494, 468, 358/442; 382/312, 313  
See application file for complete search history.

(56) References Cited

U.S. PATENT DOCUMENTS

| | | | |
|---|---|---|---|
| 5,663,806 A * | 9/1997 | Grise et al. | 358/406 |
| 6,396,924 B1 * | 5/2002 | Suso et al. | 379/433.13 |
| 6,771,396 B1 * | 8/2004 | Cheatle et al. | 358/474 |
| 6,885,479 B1 * | 4/2005 | Pilu | 358/474 |
| 7,006,146 B1 * | 2/2006 | Tanaka et al. | 348/376 |
| 7,016,551 B1 * | 3/2006 | Abe et al. | 382/284 |
| 7,023,483 B2 * | 4/2006 | Pollard et al. | 348/351 |
| 7,324,153 B2 * | 1/2008 | Koeda et al. | 348/372 |
| 7,327,854 B2 * | 2/2008 | Aoki et al. | 382/100 |
| 7,338,042 B2 * | 3/2008 | Shimizu | 271/110 |
| 7,355,766 B2 | 4/2008 | Hoefler et al. | |
| 7,751,092 B2 * | 7/2010 | Sambongi et al. | 358/474 |
| 2004/0032428 A1 * | 2/2004 | Pilu et al. | 345/764 |
| 2007/0108284 A1 * | 5/2007 | Pankow et al. | 235/454 |
| 2008/0212150 A1 * | 9/2008 | Bremm et al. | 358/488 |
| 2008/0296393 A1 * | 12/2008 | Jovanovski et al. | 235/472.01 |
| 2009/0267895 A1 * | 10/2009 | Bunch | 345/157 |

FOREIGN PATENT DOCUMENTS

EP 1022608 7/2000

OTHER PUBLICATIONS

International Search Report of PCT/CN2012/071245.

* cited by examiner

*Primary Examiner* — Cheukfan Lee (57) ABSTRACT

A portable document scanner that records both image and voice information, comprises a digital camera module configured to capture document images, and a laser frame generator configured to project a visible beam of light forming a laser frame to indicate the corresponding field of view of the optical lens for framing a document to be captured. A light source generated by a laser diode is shaped by passing through a collimating optical element and a diffractive optical element which is configured to produce a visible laser frame for framing a document to be captured. The captured data is then stored in an internal memory of the scanner. A data connector is permanently attached to the scanner body, which is used to connect the scanner directly into a receptacle on an external device for accessing data.

13 Claims, 7 Drawing Sheets

PORTABLE SCANNER

CROSS-REFERENCE TO RELATED APPLICATIONS

The present application is a Continuation application of prior application No. PCT/CN2012/071245, entitled "Portable Scanner", filed on Feb. 17, 2012, which claims priority of U.S. provisional application No. 61/444,782 filed on Feb. 20, 2011, the entire content of which is hereby incorporated by reference.

FIELD OF THE PATENT APPLICATION

This application relates to a document scanner, and more particularly to a portable scanner incorporating a scanning mechanism which is based on using two-dimensional camera-type optics instead of using conventional one-dimensional linear photo-detector array. Most especially, it relates to such a portable scanner having a superior portability property, with optionally a capability to combine with a pen mechanism to become a writing instrument with scanning function.

BACKGROUND OF THE PATENT APPLICATION

Document scanners are well known devices that capture and digitize images of documents. Present document scanners are generally Flat-bed, Sheet-fed or Hand-held types, these scanners include a contact-type scanning mechanism comprising a contact glass, a one-dimensional photo-detector array, and a linear array of light-emitting diodes (LEDs) that serves as an illuminating source. The contact-type scanning mechanism reads one line across a page of document at a time. By moving the page of document relatively across this scanning line, the document information can then be captured in a digital format.

SUMMARY OF THE PATENT APPLICATION

The present patent application provides a new kind of hand-held scanner which is based on two-dimensional camera-type optics instead of conventional linear photo-detector array, so that design-form of the scanner is independent on the page width of an A4/US letter size. To replace the framing function of liquid crystal display (LCD), a camera-based scanner is integrated with a laser frame generator producing a visible beam of laser frame to indicate the corresponding field of view of the optical lens for framing a document to be captured. To increase the transmission efficiency for projection of laser frame, a diffractive optical element is employed to produce a highly structured visible laser output by interference effect. Consequently, the transmission efficiency can be significantly increased in comparison with the shading projection mechanism as employed in prior arts. Thus, a relatively low power, low cost, and small size laser diode can be employed in the present patent application.

In another aspect, the present patent application provides a portable scanner including: a digital camera module, wherein the digital camera module is configured to capture digital images; an optical lens optically coupled to the digital camera module; a laser frame generator, wherein the laser frame generator is configured to project a visible laser frame having a two-dimensional interference pattern; a portable scanner body housing at least the digital camera module and the optical lens; a memory coupled to the digital camera module, wherein the memory is configured to store the digital images captured by the digital camera module; a power supply coupled to the digital camera module, wherein the power supply is configured to supply power to the digital camera module; a power button on the portable scanner body configured to cause the portable scanner to turn on; a shutter button configured to control capturing of digital images; a data connector for connecting with an external computer to transfer stored data, wherein the data connector conforms to the USB or IEEE 1394 standards; an auxiliary light configured to provide illumination for capturing image under the condition of low ambient light.

In one embodiment, the digital camera module includes a central processor.

In one embodiment, the digital camera module includes a digital image sensor wherein the digital image sensor is optically coupled to the optical lens.

In one embodiment, the laser frame generator configured to project a visible laser frame which contains straight lines on the projected pattern.

In one embodiment, the laser frame generator includes a laser diode.

In one embodiment, the laser frame generator includes at least one diffractive optical element.

In one embodiment, the laser frame generator includes a collimating element.

In one embodiment, the laser frame generator includes a laser frame generator body housing at least the laser diode.

In one embodiment, the memory includes a non-volatile internal memory.

In one embodiment, the memory includes a removable memory.

In one embodiment, the shutter button includes a two-stage pressure sensitive button. When the shutter button is pressed to the first stage, the projection of the laser frame is activated; when the shutter button is further depressed to the second stage, the image capture mechanism is activated.

In one embodiment, the portable scanner further includes an auto-focus unit coupled to the digital camera module, wherein the auto-focus unit is configured to adjust the optical lens to obtain best focus of image to the image sensor according to various distance between the portable scanner and the object being captured.

In one embodiment, the auto-focus unit includes a driver moving a position of the optical lens relative to the digital image sensor in a light axial direction.

In one embodiment, the portable scanner further includes: a microphone coupled to the digital camera unit; a speaker to the digital camera unit; a mode button, wherein the mode button configured to change mode of operation between image capturing and voice recording.

In one embodiment, the data connector is configured to protrude from a distal end of the scanner body.

In one embodiment, the portable scanner further includes a pen mechanism having a hollow proximal end which is removably attachable to a distal end of the scanner body, wherein the pen mechanism includes a retractable pen cartridge.

In one embodiment, the pen mechanism includes a single assembly having means for connection to a distal end of the scanner body, wherein the pen cartridge may be advanced or retracted by twisting the assembly relative to the scanner body.

In one embodiment, the pen mechanism is capable of being removably attached to the scanner body when the portable scanner is not coupled to the data port of external computer;

and the pen mechanism is capable of being detached from the scanner body when the portable scanner is coupled to the data port of external computer.

In one embodiment, the portable scanner further includes a protective outer cap, wherein the protective outer cap is configured to be removably attachable to the data connector.

In one embodiment, the protective outer cap includes an opening for accepting a key ring.

In one embodiment, the protective outer cap is capable of being removably attached to the data connector when the portable scanner is not coupled to the data port of external computer; and the protective outer cap is capable of being detached from the data connector when the portable scanner is coupled to the data port of external computer.

In third aspect, the present patent application provides a portable scanner including:
a digital camera module configured to capture digital images;
an optical lens optically coupled to the digital camera module;
a laser frame generator configured to project a visible laser frame having a two-dimensional interference pattern;
a portable scanner body housing at least the digital camera module and the optical lens;
a power supply coupled to the digital camera module and configured to supply power to the digital camera module;
a control interface on the portable scanner body comprising a power button and a shutter button, wherein the power button is configured to cause the portable scanner to turn on, and the shutter button is configured to control capturing of digital images;
a memory coupled to the digital camera module and configured to store the digital images captured by the digital camera module; and
a data connector for connecting with an external computer to transfer stored data.

In one embodiment, the portable scanner further includes an auxiliary light configured to provide illumination for capturing image under the condition of low ambient light.

In one embodiment, the digital camera module includes:
a digital image sensor optically coupled to the optical lens;
a central processor for providing functions and controls on image data acquisition and capture from the image sensor.

In one embodiment, the laser frame generator includes:
A laser diode;
a collimating element through which a collimated light source is formed when a light source of the laser diode passes;
at least one diffractive optical element which receives the collimated light source generated by the laser diode via the collimating optical element, wherein the diffractive optical element is employed to produce a highly structured visible laser output by interference effect; and
a laser frame generator body housing at least the laser diode.

In one embodiment, the memory includes a non-volatile internal memory or a removable memory.

In one embodiment, the shutter button includes a two-stage pressure sensitive button, when the shutter button is pressed to the first stage, the projection of the laser frame is activated, and when the shutter button is further depressed to the second stage, the image capture mechanism is activated.

In one embodiment, the portable scanner further includes an auto-focus unit coupled to the digital camera module, wherein the auto-focus unit is configured to adjust the optical lens to obtain best focus of image to the image sensor according to various distance between the portable scanner and the object being captured; the auto-focus unit includes a driver moving a position of the optical lens relative to the digital camera module in a light axial direction.

In one embodiment, the portable scanner further includes: a microphone and audio sensor coupled to the digital camera module.

In one embodiment, the portable scanner further includes: a audio indicator coupled to the digital camera module.

In one embodiment, the portable scanner further includes: a visual indicator coupled to the digital camera module.

In one embodiment, the control interface further includes: a mode button configured to change mode of operation between image capturing and voice recording.

In one embodiment, the data connector is configured to protrude from a distal end of the scanner body.

In one embodiment, the portable scanner further includes a pen mechanism having a hollow proximal end which is removably attachable to a distal end of the scanner body, wherein the pen mechanism includes:
a retractable pen cartridge;
a single assembly having means for connection to a distal end of the scanner body;
wherein the pen cartridge is capable of advanced or retracted by twisting the assembly relative to the scanner body; and
the pen mechanism is capable of being removably attached to the scanner body when the portable scanner is not coupled to the data port of external computer, and detached from the scanner body when the portable scanner is coupled to the data port of external computer.

In one embodiment, the portable scanner further includes a protective outer cap configured to be removably attachable to the data connector; wherein the protective outer cap includes:
an opening for accepting a key ring; and
the protective outer cap is capable of being removably attached to the data connector when the portable scanner is not coupled to the data port of external computer, and detached from the data connector when the portable scanner is coupled to the data port of external computer.

DETAILED DESCRIPTION OF THE PATENT APPLICATION

While the patent application is subject to various modifications and alternative forms, specific embodiments thereof have been shown by way of example in the drawings and will herein be described in detail. The patent application should be understood to not be limited to the particular forms disclosed, but on the contrary, the intention is to cover all modifications, equivalents, and alternatives falling within the spirit and scope of the patent application.

The present patent application discloses a portable scanner comprises a digital camera module which is configured to capture an image from a document; and a laser frame generator which is configured to project a visible beam of light forming a laser frame to indicate the corresponding field of view of optical lens of the camera module. A light source generated by a laser diode is shaped by passing through a collimating optical element and a diffractive optical element which is configured to produce a visible laser frame for framing the document to be captured. Thus, the document can be framed and captured within the field of view of the portable scanner. The portable scanner is also integrated with a microphone and audio sensor for recording voice message. The captured image or voice data is then stored in an internal memory of the scanner. A data connector is permanently attached to the scanner body, which is used to connect the scanner directly into a receptacle on an external device for accessing data. After the data connector has thus connected the scanner to the external device, the captured data can be transferred through the data connector from the internal memory of the scanner to the external device. The data connector can be either separately sheathed with a protective outer cap to serve as an attachment to keychain; or separately integrated with a pen mechanism to serve as a writing instrument when carried by user for daily use.

Details and descriptions, such as specific functions, named components, connections, protocols, etc., of the present patent application, together with the attainment of aforementioned objects may best be understood by reading the details to follow in connection with the drawings in which unique reference numerals have been used throughout for each part and wherein. It will be apparent, however, to one skilled in the art that the present patent application may be practiced without these specific details. In other instances, well known components or methods have not been described in details set forth are merely exemplary. The specific details may be varied from and still be contemplated to be within the spirit and scope of the present patent application.

Figure 1:
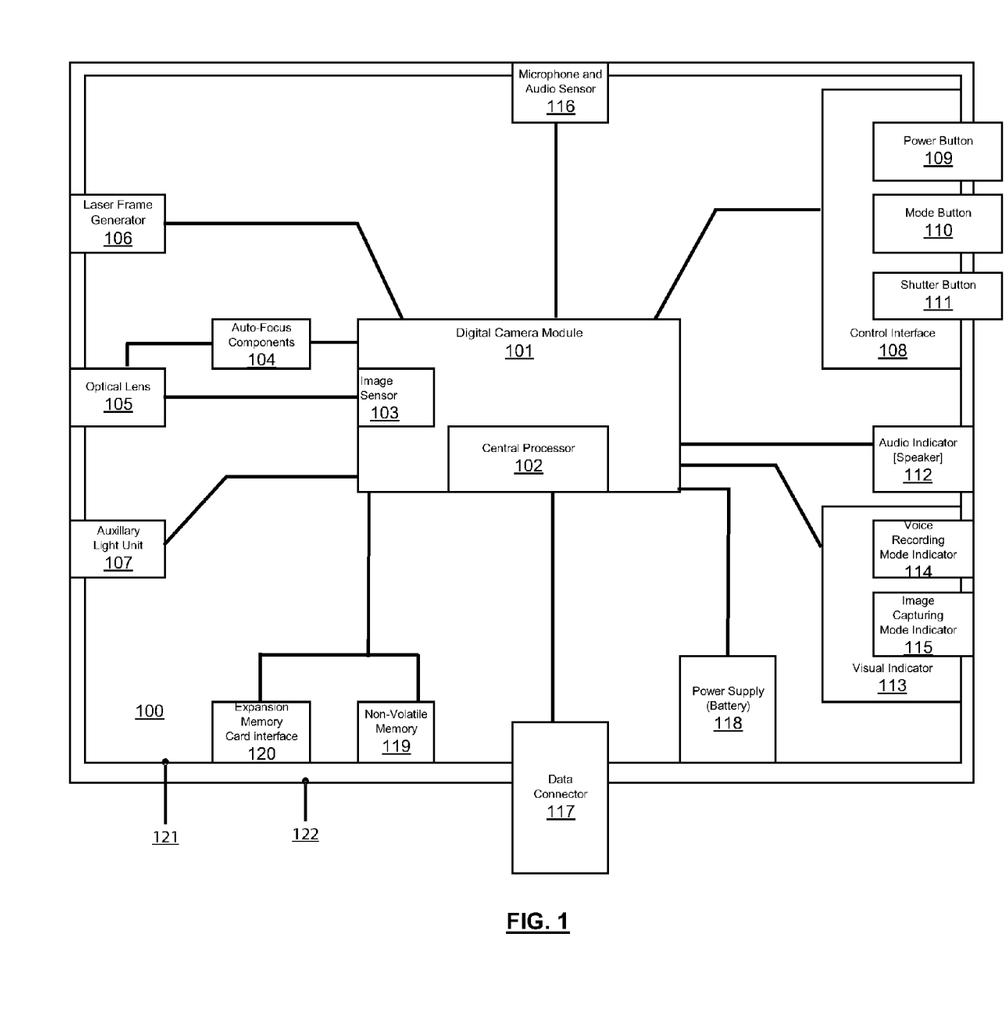
FIG. 1 illustrates a block diagram according to one embodiment of a portable scanner.

FIG. 1 illustrates one embodiment of a block diagram of a portable scanner 100. The portable scanner may have a scanner body made from an internal casing 121 and an external casing 122. The casings protect the portable scanner during handling and use. The internal casing 121 may contain electronic components associated with the portable scanner. The external casing 122 may be a hard shell designed to protect the portable scanner.

The portable scanner may include a digital camera module 101 which is configured to sense and capture image from a document via an optical lens 105. The digital camera module 101 may contain a central processor 102, such as a microprocessor AT76C115 available from ATMEL Corporation, to provide functions and controls on image data acquisition and capture from an image sensor 103, for example, a two-dimensional CMOS or CCD sensor. The digital camera module 101 may also provide a number of functions such as voice recording, image processing, image focusing, automatic exposure, automatic white balance, etc.; it may also activate an auxiliary light unit 107 which may include a white light emitting diode (LED) for capturing images under conditions of low ambient light.

The digital camera module 101 may also be equipped with an auto-focus unit 104 including a driver and related driving circuitry. The auto-focus unit 104 is coupled to the optical lens 105 for finely aligning in the light axial direction, and focusing the optical lens 105 to obtain the best focus of image to the image sensor 103 according to various distances between the portable scanner and a document being captured. An electric motor or a piezoelectric device may be employed as the driver incorporated in the auto-focus unit 104. Other well-known elements of digital camera such as, compression logic controllers, internal memory system for firmware execution, storage and data processing, etc., are not directly relevant to the present patent application and need not be described in details here.

The portable scanner may include a control interface 108 containing a two-stage shutter button 111 for auto-focusing and capturing image in image capturing mode, or for beginning and ending record of voice message in voice recording mode. The control interface 108 may further include a mode button 110 for changing mode of functions, and a power button 109 for enabling power supply 118.

Figure 2:
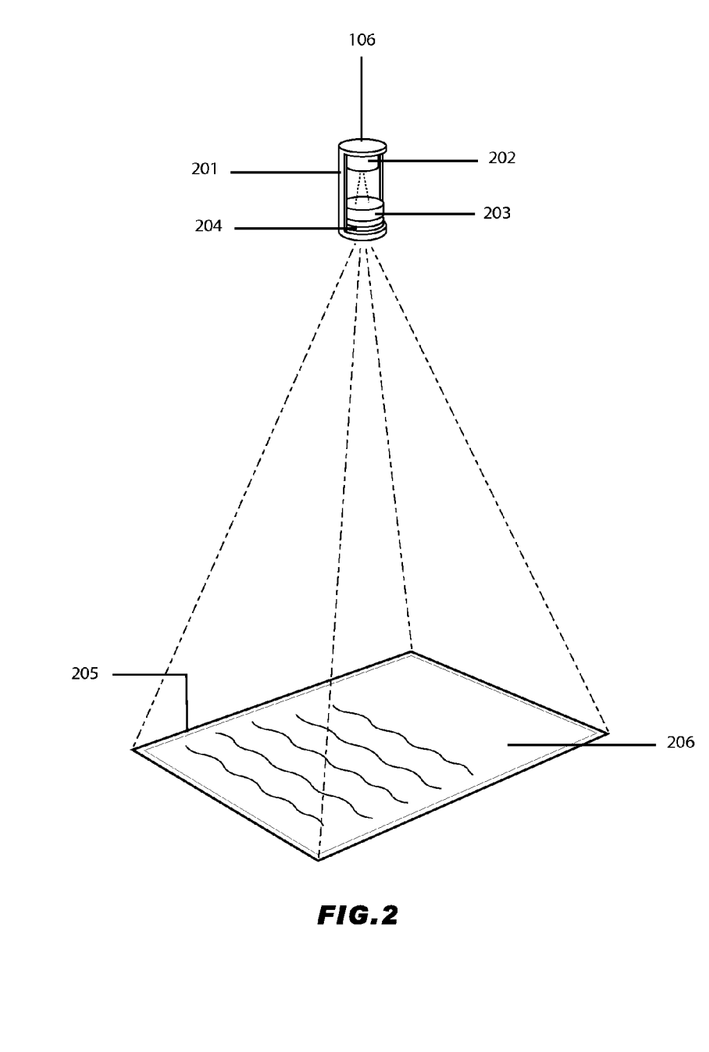
FIG. 2 is a schematic view illustrating a laser frame generator and projected laser frame according to one embodiment.

The portable scanner may include a laser frame generator 106, which is controlled by a central processor 102, to generate a visible beam of light forming a laser frame to indicate the corresponding field of view of the optical lens 105 for framing a document to be captured. FIG. 2 is a schematic view illustrating a laser frame generator and projected laser frame according to one embodiment. As shown in FIG. 2, the laser beam generator 106 may include a housing 201 containing a diffractive optical element 204 which received a collimated light source generated by a laser diode 202 via a collimating optical element 203. The collimated beam is formed when the light source of laser diode 202 passes through the collimating optical element 203. The collimated light beam passes through the diffractive optical element 204; it is then shaped into an interference pattern such that substantially all the light source received, i.e. from the laser diode 202, is projected as a structured pattern which is the laser frame 205 of the present patent application. As the laser frame 205 is shaped by means of interference effect, it retains more than 70% of light source originated from the laser diode 202 so that the transmission efficiency for laser projection can be significantly increased. Although in this embodiment, the laser frame generator 106 comprising a laser diode 202, a collimating optical element 203, and a diffractive optical element 204 are integrally formed as a single unit inside a housing 201; these components may also be configured separately, singly, or multiply, to provide the same function to project a laser frame 205 for framing a document 206 to be captured. The methodology and technology to fabricate a diffractive optical element 204 to shape a laser beam in defined pattern and specific fan angle are known, for example, the following references; thus not be described in detail here.

Referring again to FIG. 1, the portable scanner may further include a data connector 117 for transferring data, which conforms to a physical requirement of universal serial bus (USB), or another similar standard for a data transfer protocol, for example USB OTG, USB2.0, USB3.0 or the institute of electrical and electronics engineers 1394 (IEEE 1394) standard.

The portable scanner may also include a microphone and audio sensor 116 to supply a voice recording content to the central processor 102 of digital camera module 101 by converting voice signals into electrical signals for recording voice message.

The portable scanner may further include a power supply 118. Preferably all circuitry within the portable scanner may be initialized to a standby position when the power button 109 is turned on. The power supply 118 supplies power for all of the components within the portable scanner; however, once the image or voice information is captured and stored in the local non-volatile memory 119 for data storage, then the power supply 118 is no longer required to maintain the captured image or voice data. The power supply 118 may include a charging circuitry and an internal rechargeable battery; the internal rechargeable battery will be recharged when the user plugs a data connector 117 of the portable scanner into the data port on an external device, for example a computer, either directly, or via an extension cable if the data port is inconveniently located.

Visual indicators 113 may include a voice recording indicator 114 and an image capturing indicator 115. Visual indicators 113 shown here as light emitting diodes (LEDs) provide indication to user corresponding to the mode of functions and the status of operation in which the portable scanner is operating. Of course, the visual indicators 113 could be any suitable user interface, such as, for example, a black and white segment-based LCD, or an organic light emitting diode (OLED).

Audio indicator 112, such as a speaker or a piezoelectric device, may provide audio indication to user corresponding to the status of portable scanner, for example, providing indication of low battery power, low remaining memory capacity, or whenever button of control interface 108 is being pressed.

Non-volatile memory 119 for data storage may be used in the portable scanner to store any type of data. For example, the non-volatile memory may be used to store digital document images captured with the digital camera module 101, or digital audio messages recorded with the microphone and audio sensor 116. The non-volatile memory 119 may also store video files, software programs or any other type of data. In one embodiment of a portable scanner, the non-volatile memory 119 may include a 2 Gigabyte NAND Flash memory module or another type of flash memory module, so that the contents of the non-volatile memory 119 are preserved even when no power is being supplied to the non-volatile memory. The capacity of memory storage may also be supplemented by using external memory via an expansion memory card interface 120.

Figure 3:
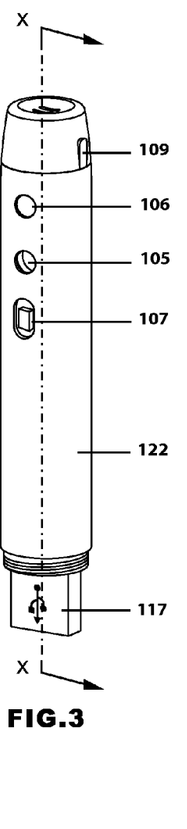
FIG. 3 is a front view according to one embodiment.
Figures 4, 5:
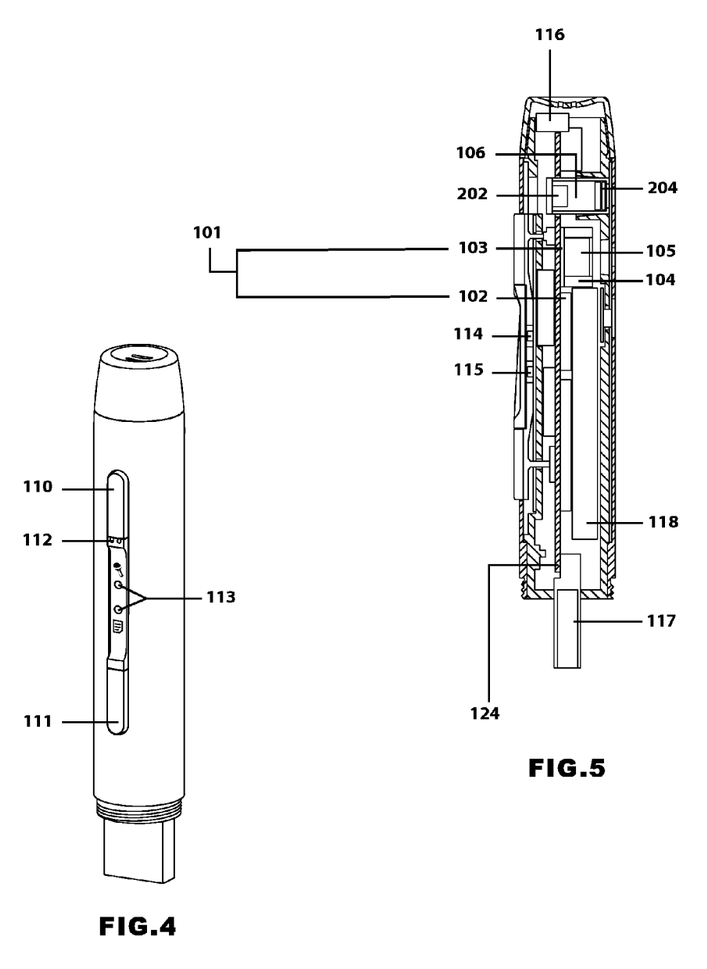
FIG. 4 is a rear view according to one embodiment.
FIG. 5 is a cross section along line "X-X" in FIG. 3 according to one embodiment.

FIG. 3, FIG. 4 and FIG. 5 illustrates a front-view, rear-view and cross-section respectively according to one embodiment of a portable scanner. As shown in FIG. 3-5, one embodiment of a portable scanner includes a digital camera module 101 comprising a central processor 102 and image sensor 103; an optical lens 105; a laser frame generator 106; an auxiliary light unit 107; audio indicator 112; visual indicators 113; and a data connector 117 which is protruded outside an opening of the external casing 122. The portable scanner may also have control interface including a power button 109, a mode button 110, and a shutter button 111.

One embodiment of a portable scanner includes an external casing 122 that is designed to enclose the internal components of the portable scanner. External casing 122 may be manufactured from metal such as aluminum alloy, so that the casing can be light-weighted, small, thin, but rigid enough to protect the internal components of the portable scanner from physical shock and other harmful elements. External casing 122 may also be designed to address such considerations as compact in size and durability. For instance, external casing 122 may be configured to fit within a total package size of 16 mm in outer diameter and 80 mm in length, which is approximately equal to a dimension of a lipstick, so that the portable scanner can fit easily into a pocket of shirt or trouser when carried by a user for daily use.

FIG. 5 illustrates a cross section diagram according to one embodiment of a portable scanner; the portable scanner includes a print circuit board 124 comprising a digital camera module 101. The digital camera module includes a central processor 102, image sensor 103 and electronics components associated with the portable scanner; it may contain an ASIC to provide various functions and controls of the operation of the portable scanner. For instance, coupling the digital camera module 101 to an optical lens 105, the portable scanner may be capable of providing various controls and functions for image processing such as automatic exposure adjustment, automatic white balance, and automatic gamma compensation, etc. In one embodiment, coupling the digital camera module 101 to a microphone and audio sensor 116, the portable scanner may be capable of converting voice signals into electrical signals for recording voice message. In other embodiments, equipping the digital camera module 101 with an auto-focus unit 104, the portable scanner may be capable of adjusting the optical lens 105 to obtain best focus of image according to various distances between the portable scanner and a document being captured.

As shown in FIGS. 3-5, a laser frame generator 106 is installed inside an external casing 122. The laser frame generator 106 is activated by a central processor 102 via a shutter button 111; it can generate a visible beam of light forming a laser frame 205 (shown in FIG. 2) to indicate the corresponding field of view of the optical lens 105 for framing a document to be captured. As the laser frame is shaped by means of interference effect via diffractive optical element 204, it retains more than 70% of the light source originated from the laser diode 202. Accordingly, a relatively a low-rating, small-sized (6 mm in outer diameter and 11 mm in length) laser diode 202, can be employed to fit into a lipstick-sized external casing 122 as aforementioned.

In one embodiment of a portable scanner includes a set of control interface buttons. The control interface may include a power button 109 for enabling power supply 118; preferably all circuitry within the portable scanner may be initialized to a standby position when the power button 109 is turned on. The control interface may further include a mode button 110 for changing functional state of the portable scanner between image capturing mode and voice recording mode; it also may include a two-stage shutter button 111 for focusing and capturing image in image capturing mode, or beginning and ending record of voice message in voice recording mode. In one embodiment, the interface buttons may be positioned and sized to facilitate one-handed operation of the portable scanner. For example, the mode button 110 and the shutter button 111 may be centrally located and sufficiently protruded from the surface of the external casing 122, whereas the power button 109 may be located nearby the top of the external casing 122, so that all of the buttons can be easily accessible to the user's hand for easy one-hand operation.

One embodiment of a portable scanner includes visual indicators 113 which may be centrally located nearby the mode button 110 and the shutter button 111. Visual indicators 113 may include a voice recording indicator 114 and an image capturing indicator 115. Visual indicators 113 shown here as light emitting diodes (LEDs) provide indication to the user corresponding to the mode of functions and the status of operation in which the portable scanner is operating. For example, the voice recording indicator 114 may include a light emitting diode (LED), such as a red LED, which can be lit, blinking, or off, depending on whether the portable scanner is either ready to begin voice recording or currently recording. Similarly, the image capturing indicator 115 may include a LED, such as a blue LED, which can be lit, blinking, or off, depending on whether the portable scanner is either ready to image capturing or currently capturing.

In one embodiment of a portable scanner, an audio indicator 112 may be located near the surface of external casing 122. The audio indicator 112, may include a speaker or piezoelectric device, provides audio indication to user corresponding to the status of portable scanner, for example, when the mode button 110 or the shutter button 111 is being pressed. The audio indicator 112, in one embodiment, may play sound from audio data associated with recorded voice messages; it may also provide an indication of low battery power or low remaining memory capacity.

One embodiment of a portable scanner includes a microphone and audio sensor 116 located near the top end of scanner body. The microphone and audio sensor 116 combined to supply a voice recording content to the central processor 102 of the portable scanner by converting voice signals into electrical signals for recording voice message.

Figure 6:
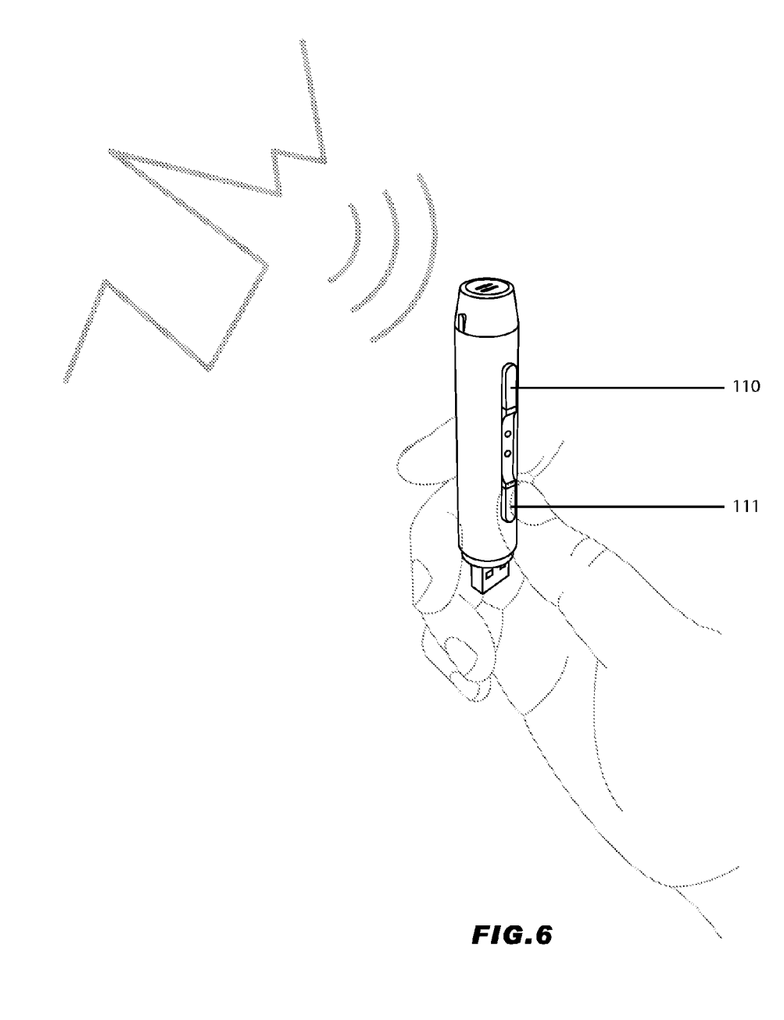
FIG. 6 is a schematic view illustrating a portable scanner being used to record voice message in voice recording mode according to one embodiment.

As shown in FIG. 6, a diagram illustrates a portable scanner being used to record voice message in voice recording mode according to one embodiment. Voice recording function can be activated when mode button 110 is pressed to change the functional state from image capturing mode to voice recording mode. Then, the shutter button 111 is pressed for beginning and ending record of voice message. Likewise, image capturing mode can be activated when mode button 110 is pressed again to change the functional state from voice recording mode back to image capturing mode.

Figure 7:
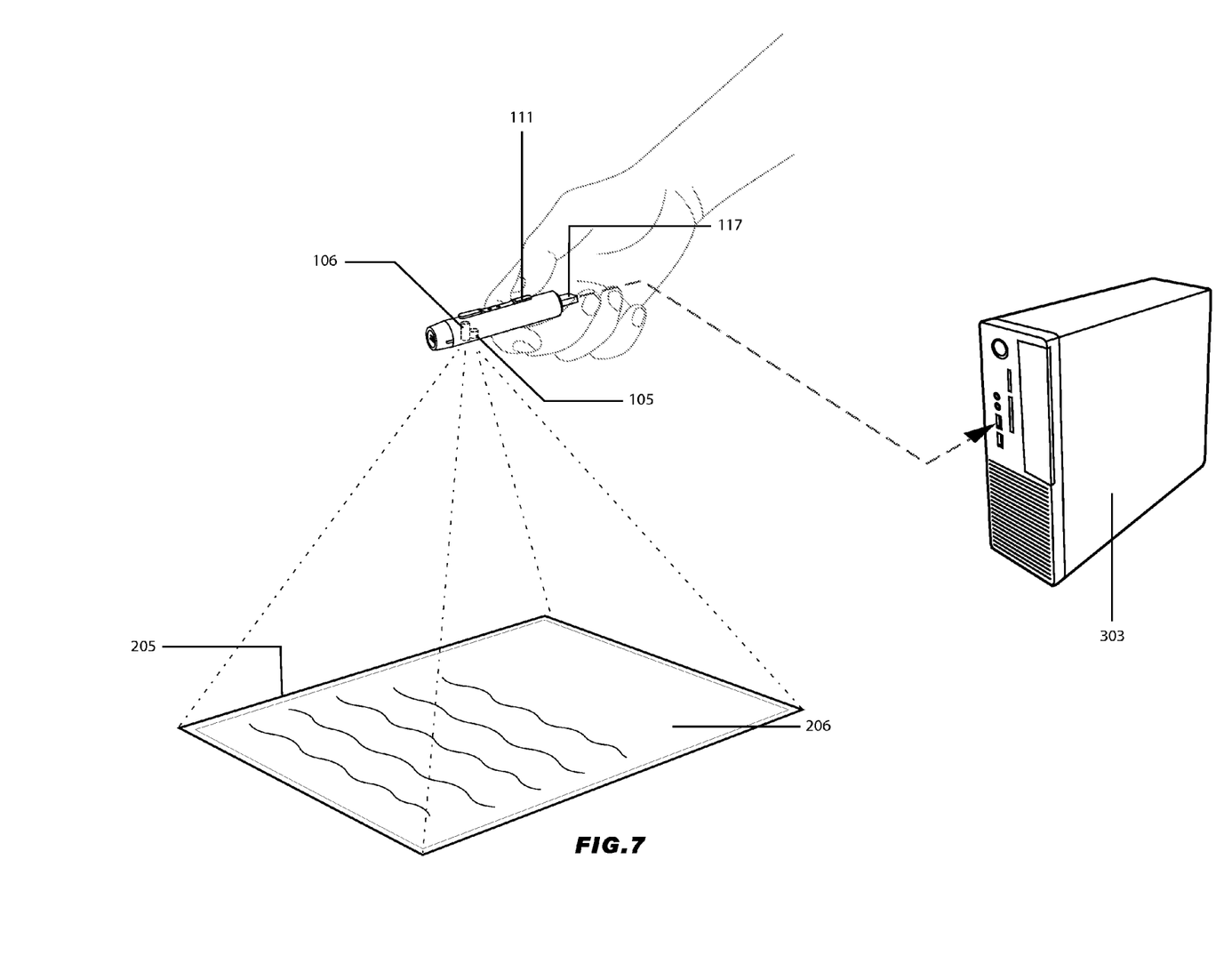
FIG. 7 is a schematic view illustrating a portable scanner being used to capture image from a document according to one embodiment.

As shown in FIG. 7, a diagram illustrates a portable scanner being used to capture image from a document according to one embodiment. In image capturing mode, when a two-stage shutter button 111 is pressed to the first stage, the projection of the laser frame 205 is activated, along with other pre-image tasks such as auto-exposure and auto-focusing of the optical lens 105. When the shutter 111 button is further depressed to the second stage, the image capture mechanism is activated. During the second stage, the laser frame generator 106 is turned off to prevent from interfering on image shooting. If the shot is going to be aborted, the user can decide to release the shutter button 111 at the first stage. In operation, a user holds the portable scanner in one hand and presses the shutter button 111 to activate the projection of the laser frame 205. The laser frame generator 106 then produces a visible beam of light forming a laser frame 205 to indicate the corresponding field of view of the optical lens 105. Thus, the user can discern the portion or the bounds of a document 206 to be imaged onto the portable scanner by simply observing where the laser frame 205 falls on the document 206. When the user identifies the desired region to be captured according to the projected laser frame 205, the user can further depress the shutter button 111 to active the image capture. The laser frame 205 is turned off during image capture stage so that the user can visually confirm that the document capture task has been completed. The captured image is then stored into the internal memory of the portable scanner. When the user has finished image capturing, the user plugs a data connector 117 directly into a receptacle on an external device 303 (which may also recharge the internal battery of the portable scanner) for data accessing. It is desirable that simply plugging the data connector 117 into an external device 303, the portable scanner may activate an appropriate software package from the external device or the scanner itself, the captured data files may then be loaded automatically from the portable scanner to the external device 303 for viewing, listening, editing or sharing.

Figure 8:
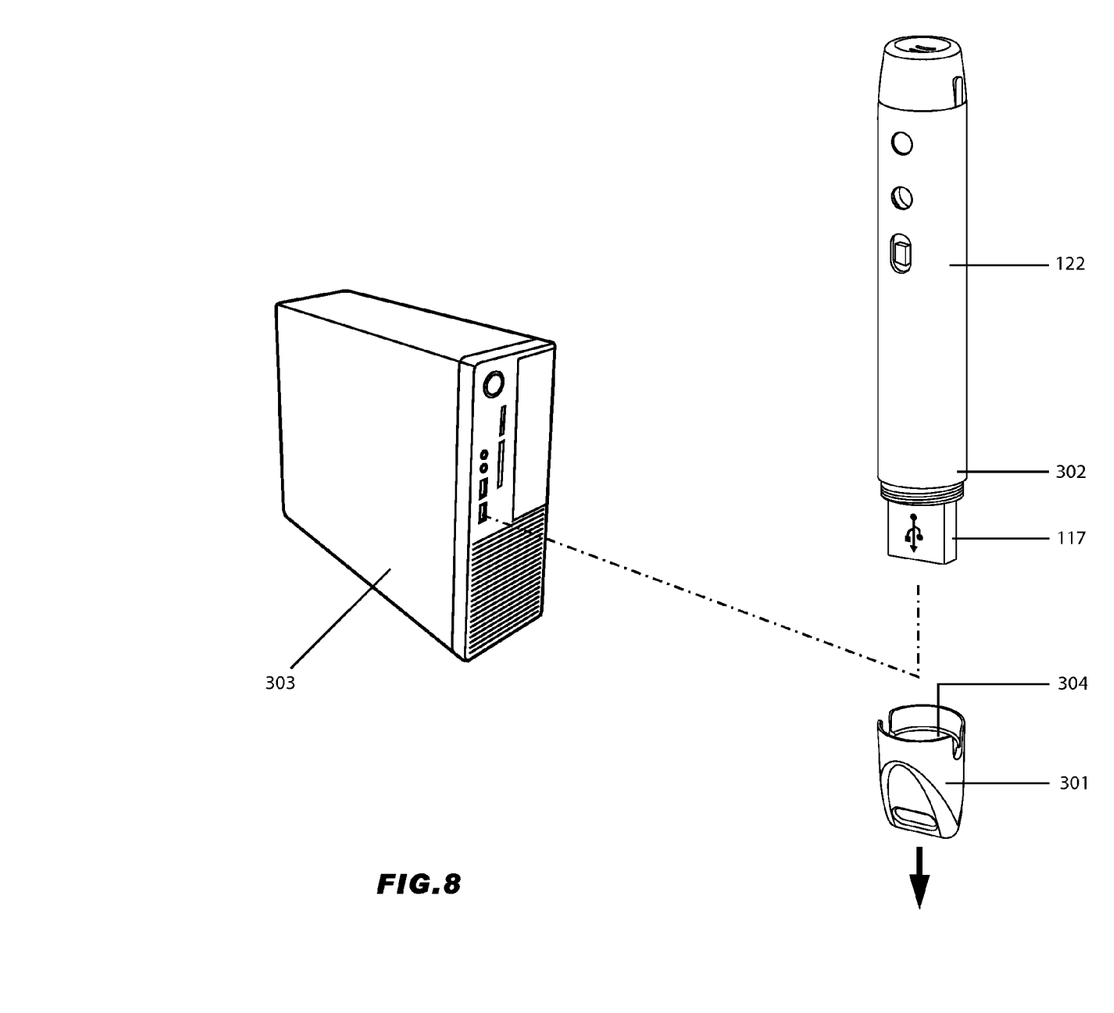
FIG. 8 illustrates a portable scanner integrating with a protective outer cap according to one embodiment.

FIG. 8 illustrates a portable scanner integrating with a protective outer cap according to one embodiment. As shown in FIG. 8, one embodiment of a portable scanner comprises an external casing 122 having a proximal end and a distal end 302. A data connector 117 (such as a male USB connector) is protruded out of the distal end 302 of external casing 122 for connecting with an external device 303, such as a computer system. The protruded data connector 117 is sheathed with a protective outer cap 301 having the dimension of inner wall 304 just match with the outer dimension of the data connector 117, so that the protective outer cap 301 can be securely sheathed with the data connector 117 by frictional force in order to cover the data connector when carried by user. The data connector 117 may conform to a physical requirement of universal serial bus (USB), or another similar standard for a data transfer protocol, for example USB OTG, USB2.0, USB3.0, or The Institute of Electrical and Electronics Engineers 1394 (IEEE 1394) standard.

The protective cap 301 may include an opening for accepting a key ring, thus when the protective outer cap 301 is closed to sheath with the data connector 117; the integrated device may further attach to a key ring to serve as a key ring attachment to be carried by user for daily use. When the protective outer cap 301 is opened to separate from the data connector 117, the data connector can be inserted directly into an appropriate receptacle on an external device 303; data can then be transferred through the data connector 117 from the internal memory of portable scanner to the external device 303. In addition, the internal battery 118 (shown in FIG. 5) of the portable scanner may be recharged simultaneously upon connecting the data connector 117 directly into the receptacle data port on an external device 303. By integrating the data connector 117 directly with a portable scanner according to present embodiment, the user can advantageously eliminate the need for external power connections or other connecting cables which tether the portable scanner to a fixed location.

Figure 9:
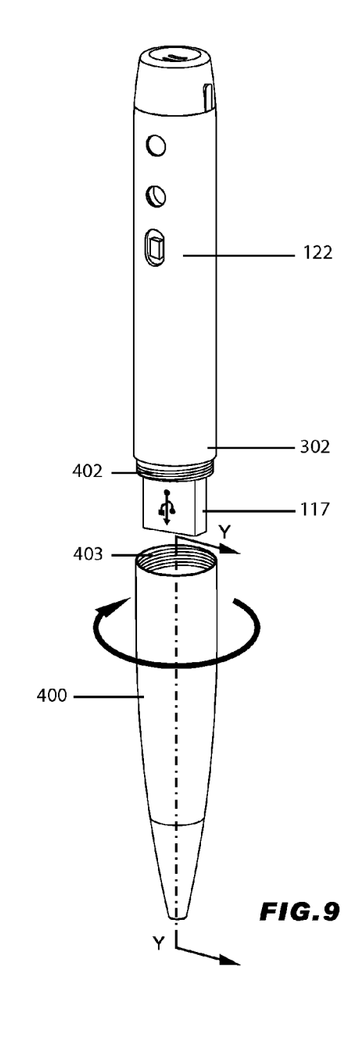
FIG. 9 illustrates a portable scanner integrating with a pen mechanism according to one embodiment.
Figure 10:
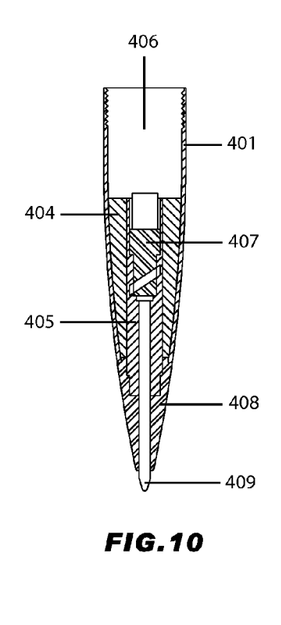
FIG. 10 is a cross section diagram along line "Y-Y" in FIG. 9 according to one embodiment of a pen mechanism.

FIG. 9 illustrates a portable scanner integrating with a pen mechanism according to one embodiment. As shown in FIG. 9, one embodiment of a portable scanner comprises an external casing 122 having a proximal end and a distal end 302. A data connector 117 (such as a male USB connector) is protruded out of the distal end 302 of external casing 122. Screw teeth 402 is configured on an outer edge of the distal end 302 of external casing 122. Screw thread 403 is configured on an inner edge of the top end of a pen mechanism 400. FIG. 10 is a cross section diagram along line "Y-Y" in FIG. 9 according to one embodiment of a pen mechanism. The pen mechanism 400, as shown in FIG. 10, is self-contained and includes a fixed cylinder 404 secured within a bottom end of pen holder 406, and an axially translatable nose cone 405 which is mounted within the fixed cylinder 404. A gripping surface 401 is formed over the fixed cylinder 404 and is the portion which is held in the user's hand while writing. A helical mounting shaft 407 secures the translatable nose cone 405 to the fixed cylinder 404 and permits axial translation of the translatable nose cone 405 relative to the fixed cylinder 404 by simple twisting of the translatable nose cone 405. Accordingly, a tip element 408 can be actually translated past the fixed pen cartridge 409 in order to retract or expose the pen cartridge. When the pen mechanism 400 is opened to separate from the external casing 122 of scanner body, the data connector 117 can be inserted directly into an appropriate receptacle on an external device 303, data can be transferred through the data connector 117 from the internal memory of portable scanner to an external device, for example a computer. The data connector 117 may conform to a physical requirement of universal serial bus (USB), or another similar standard for a data transfer protocol, for example USB OTG, USB 2.0, USB 3.0 or the Institute of Electrical and Electronics Engineers 1394 (IEEE 1394) standard. By integrating the pen mechanism 400 with a portable scanner according to present embodiment, the portable scanner is capable of serving as a writing instrument as well as document scanner. Consequently, the portability and potential use of the portable scanner can be substantially enhanced.

The embodiments described above are merely illustrative of the principles of the patent application. It will be apparent to one who is skilled in the art that many other variations and modifications can be made to the above-described embodiments without departing from the spirit and scope of the patent application. The scope of the patent application is therefore to be interpreted in accord with the limits set forth by the appended claims.

The invention claimed is:

1. A portable scanner comprising:
    a digital camera module configured to capture digital images;
    an optical lens optically coupled to the digital camera module;
    a laser frame generator configured to project a visible laser frame having a two-dimensional interference pattern;
    a portable scanner body housing at least the digital camera module and the optical lens;
    a power supply coupled to the digital camera module and configured to supply power to the digital camera module;
    a control interface on the portable scanner body comprising a power button and a shutter button, wherein the power button is configured to cause the portable scanner to turn on, and the shutter button is configured to control capturing of digital images;
    a memory coupled to the digital camera module and configured to store the digital images captured by the digital camera module; and
    a data connector for connecting with an external computer to transfer stored data;
    wherein the shutter button comprises a two-stage pressure sensitive button, when the shutter button is pressed to the first stage, the projection of the laser frame is activated, and when the shutter button is further depressed to the second stage, an image capture mechanism is activated.

2. The portable scanner of claim 1, wherein the portable scanner further comprises an auxiliary light configured to provide illumination for capturing image under the condition of low ambient light.

3. The portable scanner of claim 1, wherein the digital camera module comprises:
    an image sensor optically coupled to the optical lens; and
    a central processor for providing functions and controls on image data acquisition and capture from the image sensor.

4. The portable scanner of claim 1, wherein the laser frame generator comprises:
    a laser diode;
    a collimating element through which a collimated light source is formed when a light source of the laser diode passes;
    at least one diffractive optical element which receives the collimated light source generated by the laser diode via the collimating optical element, wherein the diffractive optical element is employed to produce a highly structured visible laser output by interference effect; and
    a laser frame generator body housing at least the laser diode.

5. The portable scanner of claim 1, wherein the memory comprises a non-volatile internal memory or a removable memory.

6. The portable scanner of claim 1, wherein the portable scanner further comprises an auto-focus unit coupled to the digital camera module, wherein the auto-focus unit is configured to adjust the optical lens to obtain best focus of image to an image sensor according to various distance between the portable scanner and the object being captured; the auto-focus unit comprises a driver moving a position of the optical lens relative to the digital camera module in a light axial direction.

7. The portable scanner of claim 1, wherein the portable scanner further comprises: a microphone and audio sensor coupled to the digital camera module.

8. The portable scanner of claim 1, wherein the portable scanner further comprises: a audio indicator coupled to the digital camera module.

9. The portable scanner of claim 1, wherein the portable scanner further comprises: a visual indicator coupled to the digital camera module.

10. The portable scanner of claim 1, wherein the control interface further comprises: a mode button configured to change mode of operation between image capturing and voice recording.

11. The portable scanner of claim 1, wherein the data connector is configured to protrude from a distal end of the scanner body.

12. The portable scanner of claim 1, wherein the portable scanner further comprises a pen mechanism having a hollow proximal end which is removably attachable to a distal end of the scanner body, wherein the pen mechanism comprises:
    a retractable pen cartridge;
    a single assembly having means for connection to a distal end of the scanner body;
    wherein the pen cartridge is capable of advanced or retracted by twisting the assembly relative to the scanner body; and
    the pen mechanism is capable of being removably attached to the scanner body when the portable scanner is not coupled to the data port of external computer, and detached from the scanner body when the portable scanner is coupled to the data port of external computer.

13. The portable scanner of claim 1, wherein the portable scanner further comprises a protective outer cap configured to be removably attachable to the data connector; wherein the protective outer cap comprises:
    an opening for accepting a key ring; and
    the protective outer cap is capable of being removably attached to the data connector when the portable scanner is not coupled to the data port of external computer, and detached from the data connector when the portable scanner is coupled to the data port of external computer.

* * * * *